United States Patent
Johnson

[11] 3,901,351
[45] Aug. 26, 1975

[54] CARRIER FOR SEISMIC EXPLODER

[76] Inventor: James M. Johnson, P.O. Box 184, Broken Arrow, Okla. 74012

[22] Filed: Aug. 24, 1973

[21] Appl. No.: 386,252

Related U.S. Application Data

[63] Continuation of Ser. No. 218,347, Jan. 17, 1972, abandoned, which is a continuation-in-part of Ser. No. 193,053, Oct. 27, 1971, abandoned.

[52] U.S. Cl.............................. 181/114; 181/401
[51] Int. Cl............................................ G01v 1/00
[58] Field of Search ........... 181/113, 114, 116, 117; 214/778

[56] References Cited
UNITED STATES PATENTS

| | | | |
|---|---|---|---|
| 2,772,746 | 12/1956 | Merten | 181/114 |
| 3,024,861 | 3/1962 | Clynch | 181/114 |
| 3,260,327 | 7/1966 | McCollum | 181/117 |
| 3,439,773 | 4/1969 | Dart et al. | 181/114 |
| 3,474,880 | 10/1969 | Gundlach | 181/114 |
| 3,525,448 | 8/1970 | Bauer | 214/778 |

Primary Examiner—Samuel Feinberg
Assistant Examiner—H. J. Tudor

[57] ABSTRACT

This invention describes a vehicle mounted framework and mechanism for transporting and handling a seismic gas exploder. A pressure fluid cylinder, piston and piston rod are supported by a framework rising vertically from the main frame of the carrier, which is supported by a vehicle. The cylinder hangs from the vertical framework and the piston is attached to a lifting plate on the exploder. Pressure fluid is used to lift and lower the exploder in normal handling. A triangular frame which is hinged at its broad end to the main frame serves as a lateral guiding means and is attached to the exploder at its narrow end. The exploder, which can be of any design, is hung from the junction of the triangular frame and the piston rod by means of a ball and socket joint so that the exploder, in resting on the earth, can adapt itself to any slope within a selected maximum angle.

When the exploder is fired, it is lifted off the surface of the earth, is guided laterally by the triangular frame, and pushes the piston rod, and the piston up in the cylinder. There is a check valve means in conjunction with the piston so that the piston can move up rapidly under the force of the rising exploder, but when the exploder tends to drop, and pulls down on the piston rod the check valve closes, providing only a minimum fluid leak so that the exploder is lowered slowly down to the earth's surface.

10 Claims, 4 Drawing Figures

CARRIER FOR SEISMIC EXPLODER

CROSS-REFERENCE TO RELATED APPLICATION

This is a continuation of application Ser. No. 218,347, filed Jan. 17, 1972 now abandoned, which is a continuation-in-part of my copending application Ser. No. 193,053 entitled "Seismic Exploder," filed Oct. 27, 1971 now abandoned.

BACKGROUND OF THE INVENTION

This invention is in the field of surface seismic sources. More particularly, it is in the field of gas explosion devices which are used for the generation of elastic waves in the earth.

Still more particularly, it concerns the structure for lifting and lowering the gun from and to the earth's surface and for checking its fall back to the earth, as it is lifted from the surface by the explosion.

In the prior art, there has been for the past several years, a growing interest in the seismic exploration industry, in the use of surface sources of seismic waves. This interest originally started with the Weight Drop system, and then the Vibroseis system and more recently, with the Gas Exploder system. In the gas exploder a movable mass is positioned and sealed inside a cylinder so as to form a shallow circular chamber beneath the mass, called an explosion chamber, a mixture of explosive gas and air or oxygen is introduced into this explosion chamber and is ignited by a spark plug. The detonation of the gas mixture presses the case downwardly against the earth, the impulse of which generates a seismic wave in the earth. At the same time the mass is driven upwardly by the explosion and as it moves upwardly, it carries the case with it, the case being lifted several feet above the surface of the earth. If the case is free to fall back to the earth, it will do so with a very large impulse against the earth, since the case and mass together may have a weight of many hundreds of pounds. Means have therefore been devised to support the exploder gun as it is lifted off the earth and to check its fall back to the earth by hydraulic means. Therefore, when it does touch the earth it will be with a very minimal force so that there will be no further generation of seismic waves.

In the prior art devices for handling and checking exploder guns the gun has been rigidly supported from a rectangular frame. This frame, which is in a vertical plane, is guided by means of rollers mounted on two vertical supports so that as the gun moves upwardly the frame moves upwardly between the rollers. There is also a hydraulic cylinder mounted on the vertical supports and the piston rod is attached to the frame so that the frame and gun can be lifted from, or lowered to, the earth surface. Also, when the gun bounces off the earth after detonation, and moves upward with the frame, the piston rod is permitted to move upwardly rapidly, because of check valve means inside the cylinder. Then, when the gun tends to fall back to the earth, its movement, and the movement of the piston in the cylinder, is checked by the closing of the check valve, and the provision of a minimal leak opening, so that the fluid in the cylinder below the piston can only move upward at a slow rate.

When the gun is resting on a purely level surface, the reaction to the explosion is to lift the gun substantially vertically, then this prior art system of frame and rollers works very well, since the frame is free to move vertically in the guiding rollers. However, when the earth surface is not level, or when, for example, the truck or other vehicle supporting this mechanism is not in a level condition because one wheel is on a rock or other object, the frame then is no longer vertical. Now, when the gun attempts to move vertically the frame which is nominally rectangular is jammed into the guiding rollers at an angle, and the frame is distorted and the rollers are prevented from operating freely. Distortion of the framework rapidly appears and the parts wear and become useless after a relatively short time of operation.

The object of this invention is to provide a simple, light-weight mechanism for handling the gas exploder gun and to check its fall back to the earth at a controlled rate after it is lifted off the earth surface by the impulse of the detonation. It is a further object to provide a mechanism which is free of distortion, friction and wear so that a long and useful life can be provided.

SUMMARY OF THE INVENTION

The weaknesses of the prior art devices are overcome and the objectives of this invention are furthered in this invention in which the vertical movement of the gas exploder gun is controlled by a hydraulic cylinder, piston, and piston rod, and the lateral movement of the gun is controlled by a triangular frame which is maintained in a substantially horizontal position. The wide end of the frame is hinged to the horizontal rectangular frame of the apparatus, and lies in a substantially horizontal plane. The narrow end of the triangular frame is attached by hinged means to the piston rod and to the exploder gun. Check valve means are provided in the piston and cylinder so that when the gun tends to rise rapidly, the piston and piston rod can move up rapidly in the cylinder but they are prevented from dropping rapidly by the closing of the check valve and provision of a minimal fluid leak.

These and other objects of this invention and a better understanding of the principles and details of the invention will be evident from the following description taken in conjunction with the appended drawings, in which:

BRIEF DESCRIPTION OF THE DRAWINGS

FIG. 2 includes details of the coupling between the gun, the piston rod and the frame and the general internal construction of the gun.

FIG. 4 illustrates a detail of the check valve means in the cylinder.

DESCRIPTION OF THE PREFERRED EMBODIMENT

Figure 1:
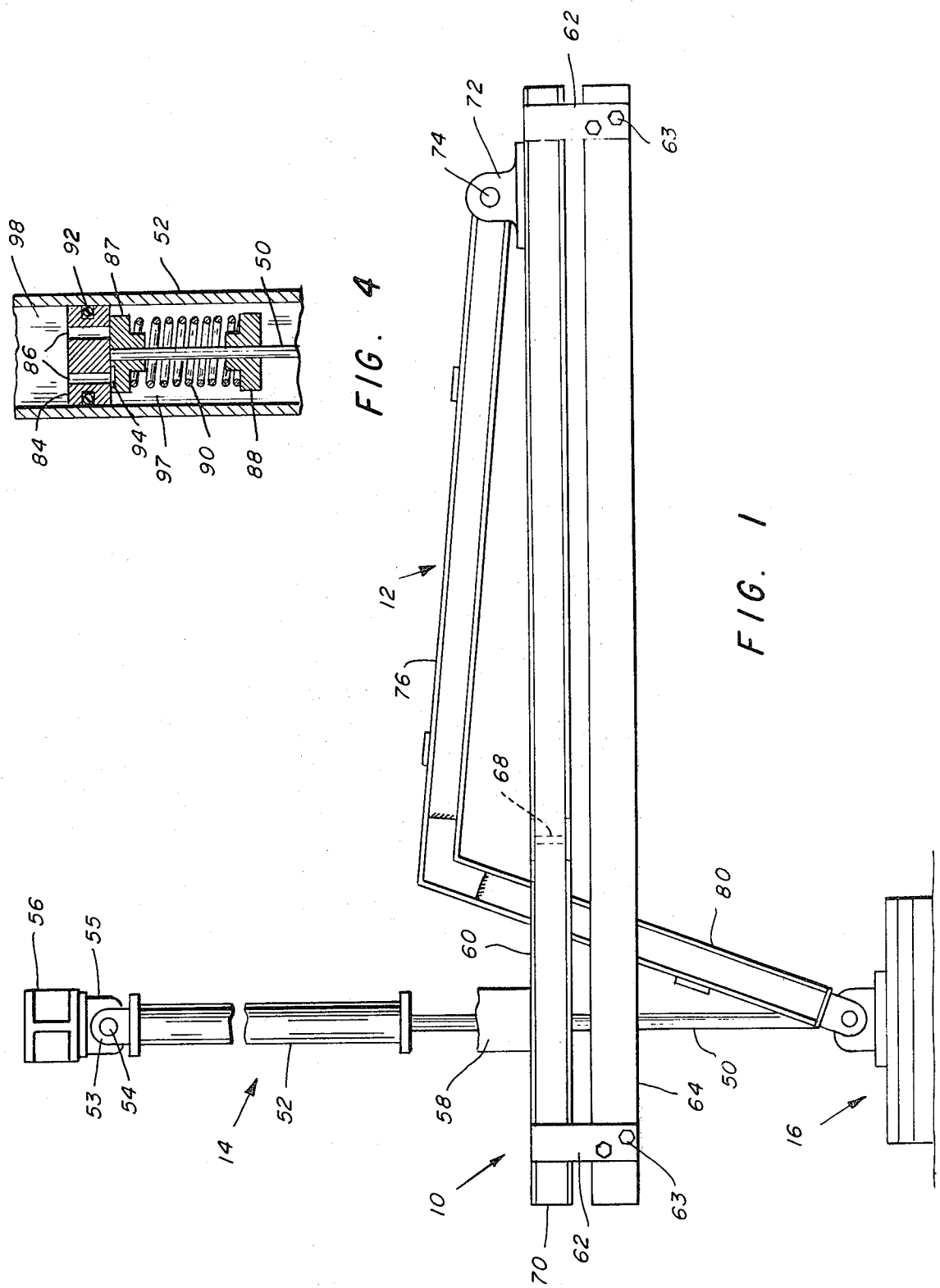
FIG. 1 represents in side elevation a preferred embodiment of this invention.

Referring now to the drawings, numeral 10 indicates generally the main frame of the apparatus which is rectangular in shape and which is supported by the truck or other vehicle. Numeral 12 indicates generally the triangular frame which provides lateral guidance to the gun. Numeral 14 represents generally the hydraulic cylinder and piston which vertically support the gun, and numeral 16 represents generally the gas exploder gun itself.

Figure 2:
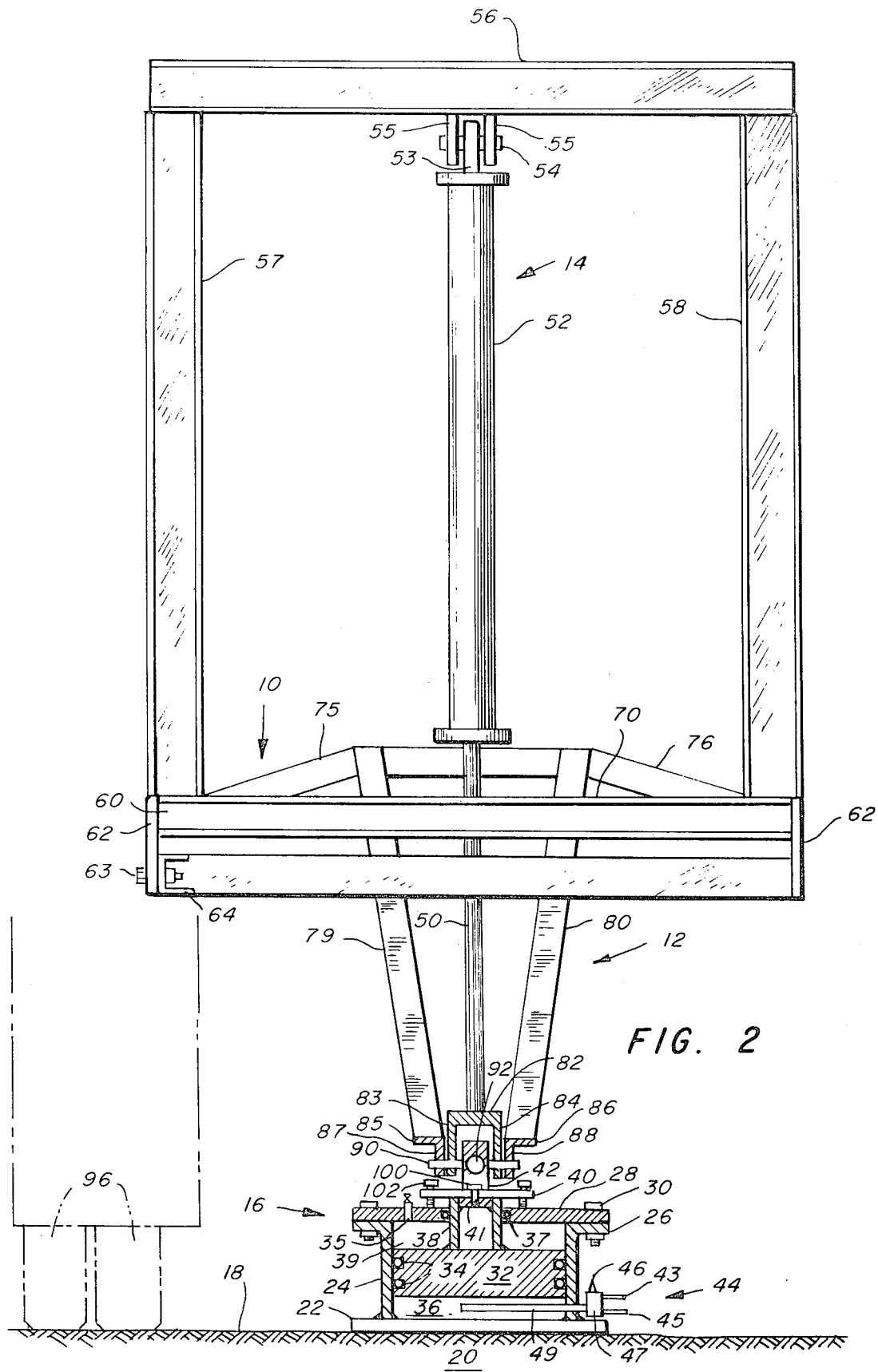
FIG. 2 represents in end elevation a view of a preferred embodiment of this invention.
Figure 3:
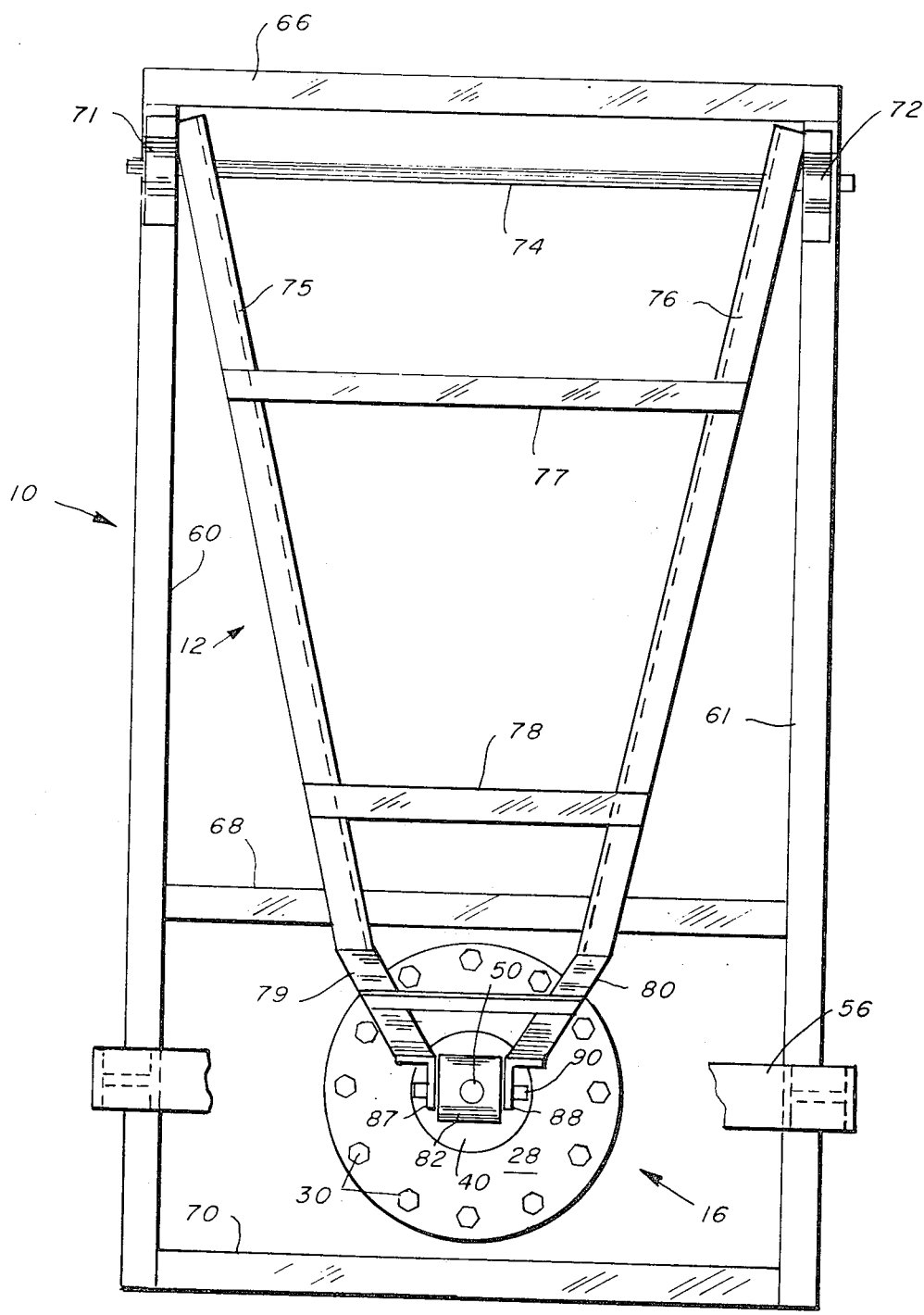
FIG. 3 illustrates in plan view the preferred embodiment of this invention.

The main frame of the equipment is comprised of a rectangular framework of structural shapes, which conveniently can be I-beams, channels, or the like, providing two long side rails, 60 and 61, with end rails 66 and 70 and other cross members such as 68. This is illustrated in FIG. 3. The framework can be supported above the frame of the truck, or other vehicle, as shown in FIGS. 1 and 2, by means of vertical brackets 62 which are welded to the main frame and can be bolted, by bolts 63, to the truck frame 64. Thus the equipment can be rapidly mounted to or demounted from one vehicle, and placed on another, etc.

The triangular frame which provides lateral guidance is comprised of two main arms which are made of structural shapes, such as channel or angle, etc. These are indicated by numerals 75 and 76. They are welded to a rod 74 which is supported in bearings 71 and 72 which are fastened to the main frame 10 by means not shown but well understood. Various cross members such as 77 and 78, etc., can be provided to strengthen the triangular frame. As shown in FIG. 1 this frame is nominally in a somewhat horizontal position, but near the narrow end, the side rails are bent into an almost vertical position so that the frame can be attached to the gun, which, when it is placed on the earth, is at a considerable distance below the framework 10. Without this bend in the frame it would not be possible to directly attach the gun to the frame 12.

In FIG. 2 the dashed lines 96 represent possible outline of wheels of the vehicle, the frame 64 of which supports frame 10 of this invention.

The hydraulic system 14 comprises cylinder 52 which is supported at its closed end by means of a plate 53 welded to the end of the cylinder. Plate 53 is rotatably supported by a shaft 54 which is supported in two plates 55 which are welded to the crossbar 56 of a structural steel framework 57, 56, 58 which rests upon and is welded to the main frame 10. As shown in FIG. 1 the cylinder is mounted substantially vertically above the nominal position of the gun when it is on the earth. As it moves vertically the gun is guided by the framework 12 to move along an arc of a circle whose center is at 74 the shaft about which the framework rotates. Thus the cylinder must have some freedom to rotate about its support, hence the shaft 54.

The cylinder 52 is filled with pressure fluid by means of a pipe through the wall of said cylinder, now shown, but well known in the art.

The structure, by means of which, the piston rod 50, the triangular frame 12 and the gun 16 are connected together is somewhat critical so as to provide all of the necessary degrees of freedom. In FIG. 2 is illustrated in cross section a gas exploder gun and the type of mounting called for by this invention. At the lower end of the piston rod 50 is a U-shaped bracket 82 having two downwardly depending arms 83 and 84. These are bored to receive a horizontal shaft 90. There are also two angle brackets 85 and 86 with arms 87 and 88 which are bored to receive the shaft 90. These angle brackets are welded to the principal arms 79 and 80 of the triangular frame 12.

The exploder gun comprises a base plate 22 which rests on the surface 18 of the earth 20. There is a vertical cylinder wall 24 which carries a flange 26, and a cover plate 28 which is bolted to the flange by a plurality of bolts 30. Slidably sealed inside of the cylinder is a circular means 32 which is sealed by O-rings 34. A vertical cylinder coaxial extenion 38 is welded to the mass and it passes upwardly through an opening in the cover plate 28, where it is sealed by means of O-ring 37. The top of this extension has a plate 41 welded to it. A support plate 40 and a vertical carrier plate 42 welded to it is attached by bolts 100 to plate 41. The support plate 40 has a plurality of screws 102 by means of which its spacing from plate 28, and, correspondingly the spacing of mass 32 from plate 22 can be adjusted. This permits variation in the volume of the explosion chamber 36 and of the air chamber 39.

As illustrated in the copending application Ser. No. 193,053, propane and oxygen, or other gases, can be provided through means 43 and 45 in fixture 47. A spark plug 46 is provided for detonating this mixture, which passes through pipe 49 into the explosion chamber 36. The gas in the chamber 36 is detonated. This drives the base plate 22 and case 24 downwardly, and forces the mass 32 upwardly. Air valve 35 permits injection of compressed air in the space 39 between the mass 32 and the cover plate 28. The mass is supported from the shaft 90 so that as it moves upwardly it presses on the piston rod 50 which moves the piston in the cylinder toward the top. As it moves upwardly the mass 32 compresses the air in space 39, compressing it to the point where the case is lifted off the earth and moves up with the mass.

Referring to FIG. 4, it is seen that the piston 84 is guided inside the cylinder 52 and is sealed by means of O-ring 92. There are a plurality of openings 86 drilled through the piston which are covered by a sliding member 87 which slides along the piston rod, but is pressed upwardly against the piston by means of spring 90, the bottom end of which is held against stop 88, which is attached to the piston rod. As the rod and piston move upwardly fluid flows downward from the space 98 above the piston, through openings 86 forcing the member 87 downwardly against the spring 90. This uncovers the openings and provides free movement of the fluid and relatively free upward movement of the piston and piston rod. However, when the exploder reaches the top of its free flight and starts to fall, the piston is pulled down by the piston rod and the fixture 87 moves against the piston, closing the openings 86 except for a minor leak opening 94. Since the piston can only move downwardly when fluid flows out of the space 97 below it, the rate of fall is limited by the size of the opening 94, which is under control of the designer. Thus the cylinder and piston system indicated by the numeral 14 serves to provide relatively unrestrained upward movement of the exploder but provides a restraint to the downward movement, to a low enough velocity, so that when the exploder eventually falls back to the earth the impact will be a minor one, and whatever seismic waves are generated by this contact, they will be too weak to effect any recording instruments.

When the surface 18 of the earth is not perfectly horizontal, it is important that the base plate 22 of the exploder be free to adapt to the actual slope of the earth. This is provided, in this embodiment, by means of a ball and socket fixture 92 on the shaft 90 that supports the exploder. This is a commercial piece of apparatus and is available on the market. It provides opportunity for the exploder, supported by the vertical plate 42, to assume any angle with the horizontal up to a maximum for which this system is designed. The fixture 82 is sufficiently wide, providing spaces between the plate 42 and the arms 83 and 84, so that as the exploder tilts it will not be limited in its angle by the spacing of the arms 83 and 84.

While this embodiment of a supporting structure can be used with any type of gas exploding gun, it is most effectively used with an exploder of the type illustrated in FIG. 2 which is based upon and has improvements upon the gas exploder in the copending application Ser. No. 193,053. Those parts of this copending application related to the design of the gun itself, denoted by numeral 16, and the fuel mixture apparatus designated by the numeral 44 are incorporated into this application by reference, and therefore need not be detailed and described in greater detail at this time.

While this invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A gas exploder system for generating seismic waves in the earth including a transport vehicle, a gas exploder gun having symmetry about a vertical axis, and gun carrier means for supporting said exploder gun, said gun carrier means, comprising:
    a. an elongated rectangular frame supported on said transport vehicle;
    b. a substantially isosceles triangular guide frame hingedly fastened at its base end to a first end of said rectangular frame by at least two spaced apart hinge means in a substantially horizontal position, about a horizontal axis;
    c. the apex of said triangular guide frame hingedly fastened to said gun above the axis of said gun, said gun positioned near the second end of said rectangular frame;
    d. hydraulic cylinder means supported with its axis vertical and its closed end uppermost, substantially over said apex and said axis of said gun, the piston rod of said cylinder extending downwardly and hingedly connected to said apex and said gun; and
    e. means to fill said cylinder with pressure fluid.

2. The gas exploder system as in claim 1 in which said gas exploder gun comprises:
    a. a base plate supported on the earth;
    b. a cylindrical wall welded to said base plate;
    c. a cover plate adapted to be clamped and sealed to said wall;
    d. a cylindrical mass vertically reciprocally sealed inside said wall, a cylindrical axial projection on top of said mass;
    e. an opening in said cover plate to pass and seal said projection;
    f. plate means across said projection above said cover plate adapted to support said mass to provide a flat circular explosion chamber beneath said mass, and support means attached to said plate means;
    g. means to inject an explosive gas mixture into said chamber, means to detonate said mixture and means to expel the products of detonation from said chamber.

3. The gas exploder system as in claim 2 including means to inject air under pressure into the space between the top of said mass and said cover plate.

4. The gas exploder system as in claim 2 including means to vary the rest position of said mass with respect to said base plate.

5. The gas exploder system as in claim 1 in which the apex of said triangular frame is bent downwardly so as to extend below the plane of said frame.

6. The gas exploder system as in claim 1 in which said gun is supported by said piston rod and guided by said guide frame and including means to provide swivel action for tilting said gun in all directions over limited angles.

7. The gas exploder system as in claim 6 in which said means to provide swivel action includes ball and socket means.

8. The gas exploder system as in claim 6 in which the piston rod, swivel action means and gun are all coaxial.

9. The gas exploder system as in claim 1 including check valve means in said cylinder to permit rapid vertical motion of said gun, and leak means to restrain downward movement of said gun to a selected rate.

10. The gas exploder system as in claim 1 in which both the guide frame and the piston rod are connected to the gun on its axis at its top.

* * * * *